United States Patent
Hulbert et al.

(10) Patent No.: US 10,711,818 B2
(45) Date of Patent: Jul. 14, 2020

(54) ONE-TIME ONLY SNAP CONNECTION SYSTEM MOUNTING TWO PARTS AND A SENSOR MOUNTING SYSTEM USING THE SNAP CONNECTION SYSTEM

(71) Applicant: MANN+HUMMEL GMBH, Ludwigsburg (DE)

(72) Inventors: Henry Hulbert, Cincinnati, OH (US); Brad Olson, Richland, MI (US); Jason Worrall, Portage, MI (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 538 days.

(21) Appl. No.: 15/640,570

(22) Filed: Jul. 2, 2017

(65) Prior Publication Data

US 2018/0003207 A1    Jan. 4, 2018

Related U.S. Application Data

(60) Provisional application No. 62/357,929, filed on Jul. 1, 2016.

(51) Int. Cl.
  *F16B 17/00*  (2006.01)
  *F02B 77/08*  (2006.01)

(52) U.S. Cl.
  CPC ............ *F16B 17/00* (2013.01); *F02B 77/085* (2013.01)

(58) Field of Classification Search
  CPC ...... F02B 77/085; F02B 77/086; F16B 17/00; F16B 17/004; F02M 35/00; F02M 35/02; F02M 35/10091; F02M 35/10144; F02M 35/10006; F02M 35/10373
  See application file for complete search history.

(56) References Cited

U.S. PATENT DOCUMENTS

| 4,651,702 A | 3/1987 | Nara et al. |
| 5,317,995 A | 6/1994 | Bruemmer et al. |
| 5,733,044 A * | 3/1998 | Rose ............... G01K 13/02 374/144 |

(Continued)

FOREIGN PATENT DOCUMENTS

| DE | 3936088 A1 | 7/1990 |
| DE | 19846282 A1 | 4/2000 |

(Continued)

*Primary Examiner* — Jonathan P Masinick
(74) *Attorney, Agent, or Firm* — James Hasselbeck

(57) ABSTRACT

An enforced one-time snap connection system mounts a first component to a second component. The first component has a circumferentially extending groove formed into an exterior surface. The second component has an annular mounting adapter having an internal bore. An annular retainer is secured on an end of the second component at the internal bore, the annular retainer includes an axially extending annular portion having a radially inwardly projecting annular locking rib received into the circumferentially extending groove during installation of the first component into the second component such that the annular locking rib or locking tabs and/or the circumferentially extending groove are critically damaged or destroyed if the first component is removed from the second component, thereby preventing re-assembly and re-locking of the components together again.

7 Claims, 2 Drawing Sheets

(56) References Cited

U.S. PATENT DOCUMENTS

| | | | |
|---|---|---|---|
| 6,374,685 B1* | 4/2002 | Daly | B29C 65/565 73/824 |
| 7,171,865 B2* | 2/2007 | Hueftle | G01D 11/245 73/866.5 |
| 7,237,948 B2* | 7/2007 | Nakabayashi | G01K 13/02 374/148 |
| 7,299,688 B2* | 11/2007 | Salvisberg | F02B 27/005 73/114.14 |
| 7,410,294 B2* | 8/2008 | Shiraki | G01K 1/14 374/163 |
| 7,610,748 B2* | 11/2009 | Kono | F01N 13/011 60/276 |
| 10,221,978 B2* | 3/2019 | Duhon | F16L 41/008 |
| 10,436,360 B2* | 10/2019 | Eilert | F16L 37/52 |
| 2004/0028503 A1* | 2/2004 | Charles | F16B 17/00 411/510 |
| 2006/0144376 A1 | 7/2006 | Gschwind et al. | |
| 2007/0186913 A1 | 8/2007 | Ideguchi et al. | |
| 2012/0031364 A1* | 2/2012 | Schweiger | F02M 35/10085 123/184.21 |
| 2012/0104744 A1* | 5/2012 | Petty | F16L 33/222 285/31 |
| 2017/0114935 A1* | 4/2017 | Kujawski, Jr. | F16L 37/088 |
| 2018/0045149 A1* | 2/2018 | Williams | F02M 35/10144 |
| 2019/0360511 A1* | 11/2019 | Hurley | F16B 17/00 |

FOREIGN PATENT DOCUMENTS

| | | |
|---|---|---|
| DE | 10249740 A1 | 5/2004 |
| EP | 1249647 A2 | 10/2002 |
| EP | 1557601 A1 | 7/2005 |
| EP | 1674678 A1 | 6/2006 |
| EP | 2546482 A1 | 1/2013 |
| FR | 2851315 A1 | 8/2004 |
| JP | H08151939 A | 6/1996 |
| JP | H1114419 A | 1/1999 |

* cited by examiner

ONE-TIME ONLY SNAP CONNECTION SYSTEM MOUNTING TWO PARTS AND A SENSOR MOUNTING SYSTEM USING THE SNAP CONNECTION SYSTEM

CROSS-REFERENCE TO RELATED APPLICATION

This application claims the benefit of U.S. Provisional Application No. 62/357,929, filed Jul. 1, 2016. The entire contents of the aforesaid U.S. Provisional Application being incorporated herein by reference.

TECHNICAL FIELD

The present teachings generally relates to an enforced one-time snap connection system for securely fasting one component to another. The present teachings more particularly, the present teachings relate to a one-time snap connect and sealing system for mounting a component or conduit, such as a sensor or heated port, to a duct, such as an air intake duct of a motor vehicle. The present teachings more particularly, relates to mounting systems which self-destruct and become inoperable when tampered with, so as to not be usable again.

The snap connection and sealing system can be quickly and easily connected together with a locking action, and thereafter the component parts of the connector will not be separable from each other without destroying the snap connection system. In one particular application, the present teachings relate to a one-time fixed tamper-resistant snap connection system mounting a heated port or sensor tube onto a clean side air duct of a motor vehicle.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Corresponding reference numerals indicate corresponding parts throughout the several views of the drawings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1:
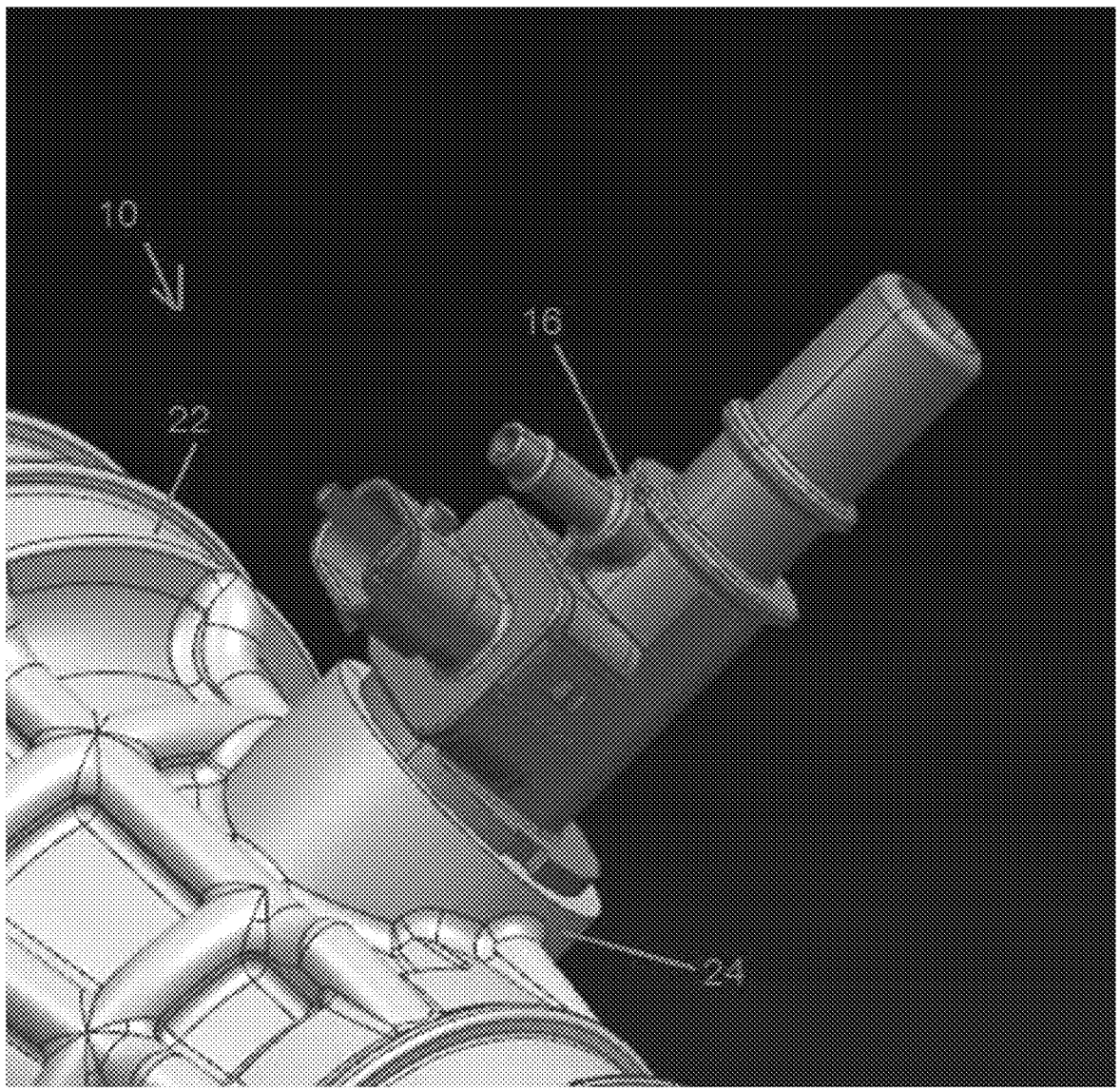
FIG. 1 is a perspective view of one embodiment of an enforced one-time snap connection system for securely fasting one component to another, according to one embodiment of the present disclosure, the enforced one-time snap connection system being shown mounting and connecting a heated port or sensor tube onto to a clean-side air duct.
Figure 2:
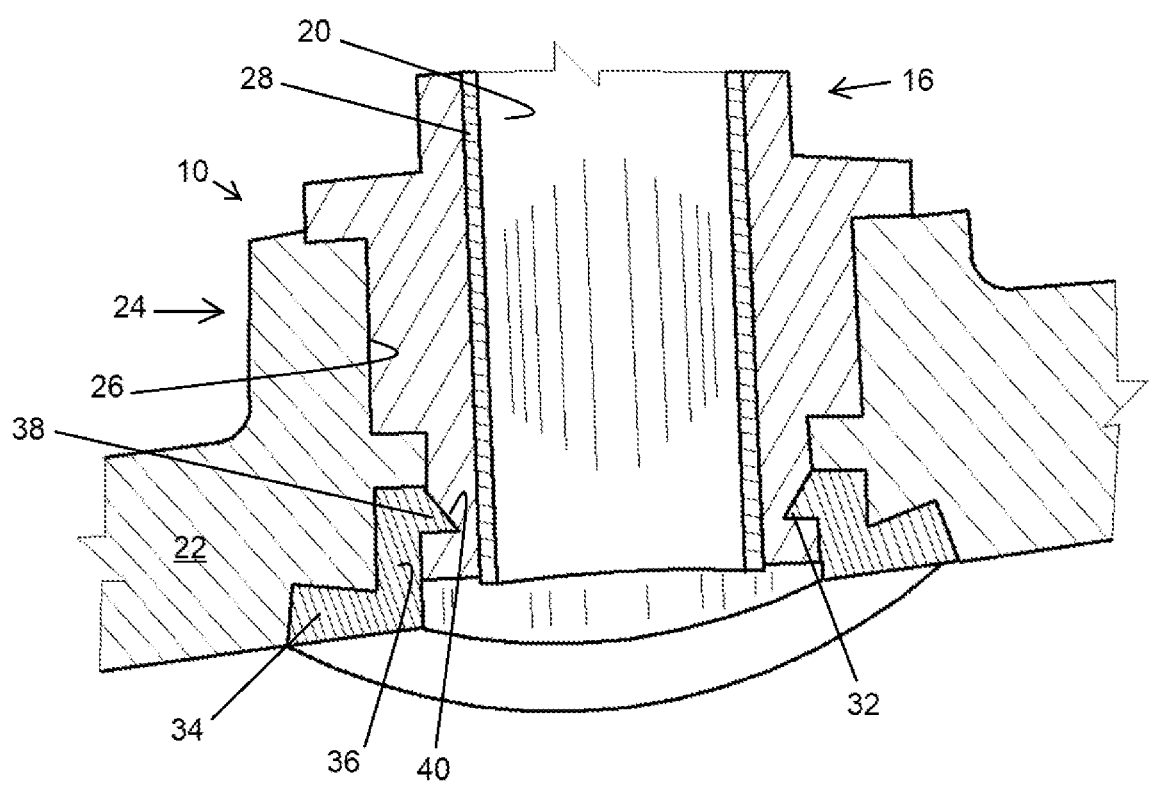
FIG. 2 is a cross sectional view of the enforced one-time snap connection system of FIG. 1, illustrating engaging, snap and mounting features of the enforced one-time snap connection system.

Referring to FIGS. 1 and 2, there is shown an enforced one-time snap connection system 10 securely fastening one component onto another. The one-time snap connection system 10 is configured such that the components may be easily permanently snapped together, but later attempts to disconnect the components after the snap connection results in critical damage or destruction of the locking mechanism of the snap connection system, rendering the snap connection system inoperable, such that attempts to re-fasten the components together using the one-time snap connection system 10 is prevented due to critical damage and/or destruction of the locking mechanism.

In FIG. 1, shows an embodiment of the enforced one-time snap connection system 10, consistent with the present inventive disclosure. The system 10 lockably integrates a tubular, heated port component 12 having an integrally formed sensor housing 18. The sensor housing 18 is configured to accept and retain a sensor (not shown) therein that may be used (for example) to sense or monitor a gaseous fluid flowing through the tubular heated port component 12.

The first component 16 of an interacting pair of components of the enforced one-time snap connection system 10 may be realized as, for example, and an elongated sensor or conducting tube 28. In this example, the tubular sleeve component 20 may be circumferentially arranged on and secured onto a radially outer surface of an elongated sensor or conducting tube 28. The elongated sensor tube 28 may optionally form part of a conduit conducting the flow of gases from or into the air intake duct 22, for example, crankcase PCV gases. In other embodiments, the tubular sleeve component 20 may directly form the elongated sensor or conducting tube 28 such that a separate elongated sensor or conducting tube 28 is eliminated.

The tubular sleeve component 20 may be unitarily formed in one piece with the elongated sensor or conducting tube 28, forming a unitary one-piece component, or the tubular sleeve component 20 may be over-molded onto the elongated sensor or conducting tube 28 or adhesively secured thereto.

In some embodiments, the air intake duct 22 may be a molded rubber duct of an elastic and flexible rubber material, for example, AEM Rubber. In another embodiment, the air intake duct 22 may be realized as an injection molded or blow molded plastic duct using techniques known in the art.

A second component 24 of an interacting pair of components, configured as an annular mounting adapter 24 may be provided on the air intake duct 22. The annular mounting adapter 24 includes an internal bore 26 extending through the air intake duct 22 from a radial exterior of the air intake duct 22 to a radial interior of the air intake duct 22. AS shown in FIG. 2, the annular mounting adapter 24 may be project radially outwardly from the radially outer side of the air intake duct 22. The annular mounting adapter 24 may be sized and configured to receive entirely or at least a portion of the first component 16 into the internal bore 26 such that the first component has flow access to a the airflow path within the air intake duct 22. The annular mounting adapter 24 may be formed together with and at the same time as the air intake duct 22 forming a unitary component. Alternatively, the annular mounting adapter 24 may be permanently secured onto the intake duct 22 such as by suitable adhesives or by thermal welding such as vibration welding, hot plate welding or laser welding or by other suitable means as is known to those skilled in the art.

In the present example, where the first component 16 may be used in a PCV gas conducting circuit, the optionally an electrically heated port, the first component 16 may include annular port portion 30 configured to fluidically connect to an associated PCV tube or conduit conducting a gas flow from the PCV gas conducting circuit (not shown) into the fluid path at an interior of the air intake duct 22.

As best seen in the cross section of FIG. 2, the second component (annular mounting adapter) 24 has an internal bore 26 receiving a first end of the first component, tubular sleeve component 20. The first end of the tubular sleeve component 20 has a circumferentially extending groove 32 formed into a radially outer surface of the tubular sleeve component 20. The circumferentially extending groove 32 may be realized as a continuous circumferential groove, or may be broken into segments, each segment spanning a portion of the circumference of the radially outer surface of the tubular sleeve component 20. An annular retainer 34 or retainer ring may be connect to, fixed onto or molded onto the interior of the annular mounting adapter 24 and may be arranged on or received into a radially inner surface of the air intake duct 22. Preferably, the annular retainer 34 is made of PPGF30 overmolded onto/into the interior of the air intake duct 22.

As best seen on FIG. 2, the annular retainer 34 may have a cross-section forming an annular extending portion of one or more axially extending legs 36, each provided with an annular locking rib 38 or locking tabs, configured to be lockably received into the circumferentially extending groove 32. The annular locking rib or locking tabs 38 are configured to be lockably received into the circumferentially extending groove 32 during installation of the first component 16 into the annular mounting adapter 24. The annular locking rib or locking tabs 38 engage with and cooperate with the circumferentially extending groove 32 to fixedly mount the first component onto the second component. Advantageously, the annular locking rib or locking tabs 38 and or the circumferentially extending groove 32 are inherently critically damaged or structurally destroyed if the first component is removed from the second component, thereby preventing reassembly and locking of the components together again. As shown in FIG. 2, the annular retainer 34 forms an annular extending portion of one or more axial legs 36 projecting outwardly in the interior of the internal bore 26. The one or more axial legs 36 may be realized as a annular closed ring forming a single axial leg that projects outwardly in the interior of the internal bore 26. An outer end of the annular extending portion of one or more axial legs 36 forms a radially inwardly projecting annular locking rib or (alternately) plurality of radially inwardly projecting locking ribs or tabs arranged about a circumference of the inner surface of the internal bore 26 and projecting inwardly into the internal bore 26. As shown in FIG. 2, the radially inwardly projecting annular locking rib or (alternately) plurality of radially inwardly projecting locking ribs or tabs preferably have an oblique sloped surface 40 (relative to an axis of the internal bore 24) and arranged in or at an interior of the internal bore 26, the sloped surface 40 engaging against and elastically deforming/deflecting a portion the outer wall of the tubular sleeve component 20 of the first component 16 inwarldy and/or optionally elastically deflecting the annular retainer 34 radially outwardly when the first component 16 is being inserted into or mounted to the annular mounting adapter 24. As the first component 16 is further axially inserted in the internal bore 26 to its final position, the radially inwardly projecting annular locking rib or (alternately) plurality of radially inwardly projecting locking tabs are elastically relaxed and received in to the circumferentially extending groove 32, thereby engaging the one-time snap connection. As is best shown in FIG. 2, an axially inner surface of the radially inwardly projecting annular locking rib or (alternately) plurality of radially inwardly projecting locking tabs preferably extends substantially perpendicular or perpendicular to an axis of the internal bore 26, thereby engaging against a complimentary shaped wall of the circumferentially extending groove 32. The axially inner surface of the annular locking rib or (alternately) plurality of radially inwardly projecting locking tabs/ribs preferably extends substantially perpendicular or perpendicular to an axis of the internal bore 26 advantageously prevents disconnection of the enforced one-time snap connection system 10 without causing critical structural damage to or destroying the enforced one-time snap connection system 10.

The disclosed enforced one-time snap connection system 10 finds advantageous use in meeting the requirements of the California Air resources Board (CARB) and environmental protection standards to meet tamper proof connection CARB requirements so as to avoid end user to trying to manipulate, disengage and reattach the components mounted by the enforced one-time snap connection system 10. The enforced one-time snap connection system 10 prevents the elongated sensor or conducting tube 28 from being removed from the air duct 22 without damaging the elongated sensor or conducting tube 28, making it unserviceable and assure that the component assembly would still comply with the CARB requirements.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An enforced one-time snap connection system, comprising:
   an elongated first component including
      a circumferentially extending groove formed into an exterior surface of the elongated first component;
   a second component including
      an annular mounting adapter having an internal bore;
      an annular retainer secured on an end of the second component at the internal bore, the annular retainer including
         an axially extending annular portion having a radially inwardly projecting annular locking rib, or axially extending legs having radially inwardly projecting locking tabs;
   wherein the radially inwardly projecting annular locking rib or the radially inwardly projecting locking tabs are lockably received into the circumferentially extending groove during installation of the first component into the second component;
   wherein the annular locking rib or locking tabs and/or the circumferentially extending groove are critically damaged or destroyed if the first component is removed from the second component, thereby preventing re-assembly and re-locking of the components together again such that the snap connection system is an enforced one-time snap connection system.

2. An enforced one-time snap connection system, comprising:
   an elongated sensor port or heated port component including:
      a radially outer circumferential surface;
      a circumferentially extending groove formed into the radially outer surface of the elongated sensor port or heated port component, forming a circumferentially continuous groove or a circumferentially segmented groove;
   an air intake duct of an internal combustion engine, including
      an annular mounting adapter formed or mounted onto a circumferential wall of the air intake duct, the annular mounting adapter having an internal bore extending radially from an radial exterior of the air intake duct to open into an air flow path in an interior of the air intake duct;
   an annular retainer arranged at, on or in a radially inner surface of the air intake duct, the annular retainer engaging with the circumferentially extending groove forming the enforced one-time snap connection, the annular retainer secured on an end of the elongated sensor port or heated port component at the internal bore, the annular retainer including
      at least one axially extending annular leg;
      at least one radially inwardly projecting annular locking rib arranged on an end of the at least one axially extending annular leg, the at least one radially inwardly projecting annular locking rib projecting radially into the internal bore;
   wherein the at least one radially inwardly projecting annular locking rib is lockably received into the circumferentially extending groove during installation of the elongated sensor port or heated port component into the annular mounting adapter of the air intake duct;
   wherein the at least one inwardly projecting annular locking rib and the circumferentially extending groove are critically damaged or destroyed if the elongated sensor port or heated port component is removed from the annular mounting adapter, thereby preventing re-assembly and re-locking of the elongated sensor port or heated port component onto the air intake duct, such that the snap connection system is an enforced one-time snap connection system.

3. The enforced one-time snap connection system according to claim 2, wherein
   the circumferentially extending groove is either a circumferentially continuous groove or is a plurality of segments each extending circumferentially about a portion of a circumference of the radially outer surface of the elongated sensor port or heated port component.

4. The enforced one-time snap connection system according to claim 2, wherein
   the at least one radially inwardly projecting annular locking rib is an annular closed ring forming a radially projecting annular locking rib projecting radially inwardly into the interior of the internal bore;
   wherein the annular locking rib has an oblique sloped surface arranged in at an interior of the internal bore, the sloped surface engaging against and elastically deforming/deflecting a portion of the radially outer surface of the elongated sensor port or heated port component inwardly and/or optionally elastically deflecting the annular retainer radially outwardly when the elongated sensor port or heated port component is being inserted into the annular mounting adapter;
   wherein, as the elongated sensor port or heated port component is further axially inserted in the internal bore to a final position, the radially inwardly projecting annular locking rib is elastically relaxed and received into the circumferentially extending groove of the elongated sensor port or heated port component, thereby creating the enforced one-time snap connection.

5. The enforced one-time snap connection system according to claim 4, wherein
   the annular locking rib has an axially inner surface which extends substantially perpendicular an axis of the internal bore, thereby engaging against a complimentary shaped wall of the circumferentially extending groove, thereby preventing disconnection of the enforced one-time snap connection system without causing critical structural damage to or destroying the enforced one-time snap connection system.

6. The enforced one-time snap connection system according to claim 2, wherein
   the circumferentially extending groove is formed by a plurality of groove segments each extending circumferentially about a portion of a circumference of the radially outer surface of the elongated sensor port or heated port component;
   the at least one radially inwardly projecting annular locking rib projects radially inwardly into the interior of the internal bore and is configured to engage respective one of the plurality of groove segments;
   wherein the at least one annular locking rib has an oblique sloped surface arranged in at an interior of the internal bore, the sloped surface engaging against and elastically deforming/deflecting a portion the radially outer surface of the elongated sensor port or heated port component inwarldy and/or optionally elastically deflecting the annular retainer radially outwardly when the elongated sensor port or heated port component is being inserted into the annular mounting adapter;
   wherein, as the elongated sensor port or heated port component is further axially inserted in the internal bore to a final position, the at least one radially inwardly projecting annular locking rib is elastically relaxed and received into the respective groove segment of the plurality of groove segments of the elongated sensor port or heated port component, thereby creating the enforced one-time snap connection.

7. The enforced one-time snap connection system according to claim 6, wherein the at least one annular locking rib has an axially inner surface projecting inwardly into the internal bore and which extends substantially perpendicular an axis of the internal bore, thereby engaging against a complimentary shaped wall of the respective groove segment of the plurality of groove segments of the elongated sensor port or heated port component, preventing disconnection of the enforced one-time snap connection system without causing critical structural damage to or destroying the enforced one-time snap connection system.

* * * * *